Oct. 9, 1951 J. STIVIN 2,570,883
ELIMINATION OF DEFORMATION DURING SURFACE HARDENING
Filed Jan. 23, 1947 2 Sheets-Sheet 1

Inventor
J. Stivin
By Glascock Downing Hubbell
Attys

Oct. 9, 1951   J. STIVIN   2,570,883
ELIMINATION OF DEFORMATION DURING SURFACE HARDENING
Filed Jan. 23, 1947   2 Sheets-Sheet 2

Inventor
J. Stivin
By Glascock Downing Fechtl
Attys

Patented Oct. 9, 1951

2,570,883

UNITED STATES PATENT OFFICE 2,570,883

ELIMINATION OF DEFORMATION DURING SURFACE HARDENING

Jiří Stivín, Čelakovice, near Prague, Czechoslovakia

Application January 23, 1947, Serial No. 723,796
In Germany January 5, 1944

Section 1, Public Law 690, August 8, 1946
Patent expires January 5, 1964

9 Claims. (Cl. 148—10.5)

In many cases it is of advantage, when hardening articles which are to be operated on, to limit this hardening exclusively to the surface layers of the articles. In practice this is effected, for instance, by heating only the surface of the article to be hardened to the desired hardening temperature, for instance by means of a gas burner, by immersing it for a short time in a salt bath or by induced eddy currents or the like. The hardening is then finished in the usual way by rapid chilling.

In this process, however, deformations occur in the hardened article. Their origin may be explained by the circumstance, that the hardening layer consisting substantially of martensite differs, as regards its specific weight or volume, from the unhardened core of the article, so that, after hardening, the volume of the hardened surface layer is greater than before hardening. Deformation forces are thereby produced in the hardened article, so that the article suffers a deformation. Now, these deformations cannot be subsequently removed, since, should it be attempted to do so by mechanical means, for instance by pressing or forging, considerable internal stresses are set up in the hardened article, which not only cause the return of the deformation after a certain time, but above all reduce the mechanical strength of the article.

Figure 1:
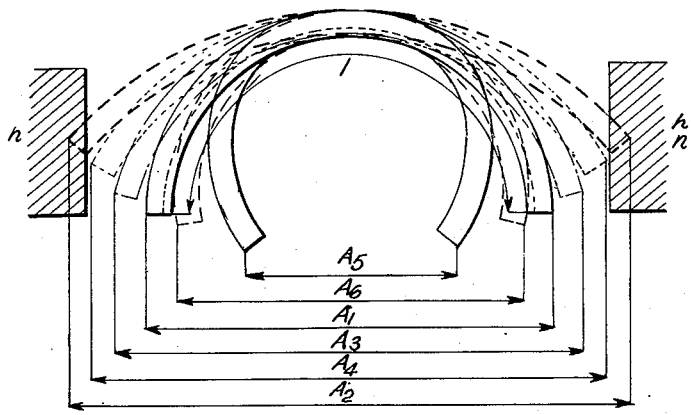

In the invention use is made of the following behaviour of the material. On a semicircular metal strip, as shown in Figure 1, being heated on its inner side, only the shaded layer becomes heated, whereas the outer unshaded layer remains cold. Through this heating the developed length $l$ of the inner (shaded) layer will be increased by an amount $dl$. The deformation of the strip is similar to that which the strip would show, if it should consist of two layers having different coefficients of expansion and thus form a so-called bimetallic strip. On the temperature of the inner layer increasing, the whole strip will be expanded, for instance to a length $A_2$, as is shown in the drawing. When the temperatures of the inner and the outer layer then become equalised by gradual cooling, without any changes in volume being brought about by conversion into martensite, the strip will return to its original form, that is to the length $A_1$.

If, however, while being heated, the strip be kept to the original length $A_1$ by being clamped at its ends, there will occur in the heated (shaded) layer considerable pressure stresses, in consequence of which this heated and therefore softened layer will be compressed. This compressing has the character of a permanent deformation. If again, for instance by gradual cooling, the temperatures of the inner and outer layer be equalised, the length of the inner layer will be found to be shorter by an amount $dl$. This will cause the whole strip to contract in the direction towards the inside to the amount $A_5$.

If by means of stops $n$ the strip be held, not to the original, but to a somewhat greater length, for instance to $A_4$, the case will be similar, with this difference, that the contraction of the strip after cooling will be correspondingly smaller, represented by $A_6$.

As will be gathered from the above, the strip after slow cooling will only return to the original position, if it should not have been hindered in its movement during heating. The case is different, however, if the temperatures were so high and the cooling effected so rapidly that the inner layer was chilled, that is, converted into martensite, the specific volume of which is greater than that of the initial material. Owing to this change in volume of the inner layer alone its length increases after hardening and the strip is expanded, for instance, to an amount $A_3$.

According to the invention this deformation due to the conversion into martensite is compensated by a deformation produced in the manner described above through the expansion of the strip being limited during heating. Thus, for instance, the strip according to Figure 1 would through hardening, that is, through conversion of the inner layer into martensite, be expanded to a length $A_3$. Let it be assumed that, when heated without constraint, this strip expands to a length $A_2$. If during heating the expansion of the strip be limited by means of stops to a length $A_4$, the strip would, on cooling without hardening, return to the length $A_6$. Now, if the length $A_4$ be so chosen that for the said values an equation $A-_3A_1=A_1-A_6$ applies, the deformation caused during hardening through conversion into martensite will be compensated by the deformation produced through limiting the free expansion and, after chilling, the strip will regain its original length $A_1$.

For limiting this deformation suitable, preferably adjustable stops will be provided, so that the desired compensating deformation can be accurately adjusted by shifting them. The desired position of the stops is best ascertained by practical tests, more particularly in the case of mass production. The deformation forces produced during surface heating act at a relatively short leverage and the corresponding deformations are, therefore, relatively great. Thus, for instance, the deformation due to surface heating amounts in an article, the deformation of which during hardening measures no more than a few tenths of a millimetre, up to several millimetres, so that the arrangement which would be suitable for carrying out the method according to the invention is easy to make and of very simple construction.

Figures 2, 3, 4:
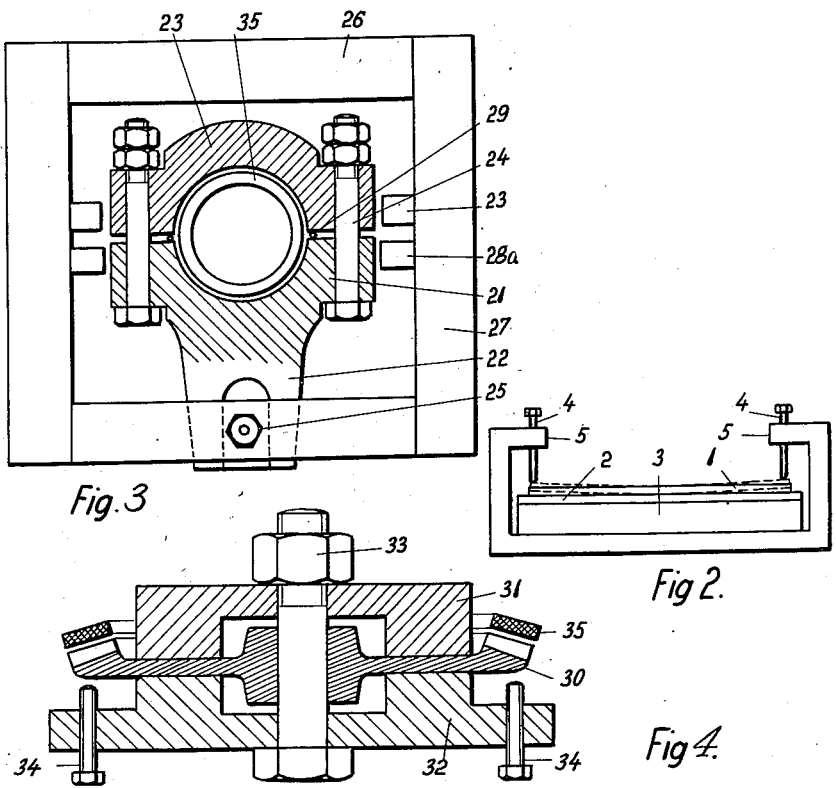
Figures 5, 6:
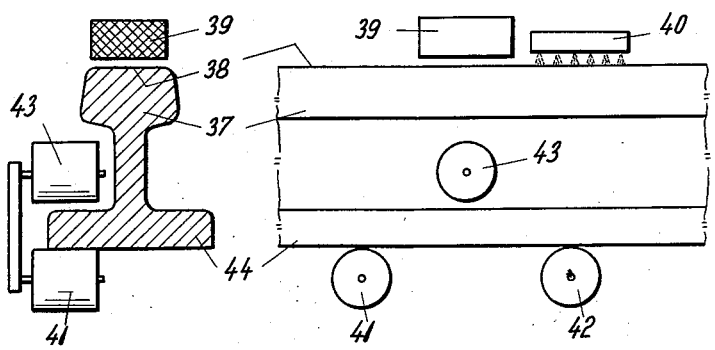

In the accompanying drawing several constructional examples of the invention are illustrated. Figure 1 is the explanatory illustration already referred to, Figure 2 shows a device for preventing permanent deformation in the surface hardening of straight articles, such as rulers, Figure 3 an arrangement, by means of which the occurrence of deformations during the hardening of the internal surfaces of connecting rod heads is prevented. Figure 4 shows a device for preventing bending deformations in bevel wheels, while Figures 5 and 6 illustrate diagrammatically an arrangement utilized in the continuous hardening of the individual surfaces of articles of considerable length.

According to Figure 2 the ruler 1 which is to be hardened at its lower surface rests with an interposed suitable insulating insertion 2 on a heating device 3 which is fed by high frequency currents and induces in the lower surface of the ruler 1 high frequency eddy currents which heat this bottom surface of the ruler 1. During this heating process the heated surface expands, so that the ruler has its ends bent upwards. With the aid of adjustable stops, for instance of screws 4, which are disposed in the arms 5 of a stirrup-like device 6, a complete deformation of the ruler 1 is prevented, namely in such a manner that the suppressed deformation causing a compression of the lower surface layer of the ruler 1 compensates the deformation which otherwise takes place during the hardening of the ruler.

Figure 3 shows an arrangement for counteracting the hardening deformation in the hardening of the inner surface of the connecting rod heads for aeroplane or motor vehicle engines. The connecting rod head is divided into two parts, namely into the part 21 connected with the connecting rod shaft 22 and the part 23 forming the cover of the connecting rod head. The two parts are joined by bolts 24.

Both the upper part and the lower part of this connecting rod behave during the heating and hardening in a similar manner to the strip in Figure 1. These deformations cannot be suppressed by powerfully tightening the bolts 24 and even secondary deformations would be caused by crushing the connecting joint. In order to prevent this crushing the bolts are left slack and in the joint between the connecting rod parts wire or other insertions 29 of a soft material, such as copper, are placed, so that the two connecting rod halves can freely expand, like the strip in Figure 1. According to the invention the deformation caused by heating is restricted, for instance through the connecting rod being clamped by means of a bolt 25 in a strong frame 26, the transverse sides of which, 27, are provided with one or with two limiting stops 28, 28a. Two stops on each side are adopted for the reason, that the parts of the connecting rod head are not expanded equally during the heating and their deformations caused by the chilling are also different. The stops are placed in such a position that the suppressed part of the heating deformation is compensated by the deformation brought about during the hardening. For the adjustment of the stops 28, 28a, the transverse members 27 may be made adjustable on the longitudinal members of the frame 26 or the stops 28, 28a may be made adjustable on the transverse members 27, for instance with the aid of set-screws.

Figure 4 shows how the method is carried out, when hardening the teeth of plate-shaped gear wheels, for instance bevel wheels. When hardening the teeth 30 of such a gear wheel, the hub of which is clamped in the plates 31, 32 by means of a bolt 33, the plate of the wheel will become bent owing to the increase in the periphery of the ring of teeth, which takes place during the hardening. This deformation is partially counteracted by adjustable stops 34 arranged below the periphery of the wheel. 35 is the high frequency arrangement.

In all these cases the chilling of the article is, of course, effected by quenching it in the clamped-in state, the deformation brought about by the heating being partially suppressed.

The method according to the invention can, of course, be modified to suit the article to be treated and the invention is by no means restricted to the constructional examples illustrated.

Thus, for instance, it is possible of course to employ the method according to the invention in the continuous hardening of the individual surfaces of articles of considerable length, such, for instance, as the surfaces of the heads of railway rails.

An arrangement suitable for this purpose is shown diagrammatically in Figures 5 and 6. For hardening the head surface 38 of a railway rail 37 a heating device 39 and, at a certain distance behind it, a chilling rose 40 are caused to travel along above the rail. Owing to the heating of the surface layers of the head surface 38 a deformation of the rail occurs, the two free ends bending slightly downwards. According to the invention this deformation caused by the heating is partially suppressed with the aid of rollers 41, 42, 43, which are disposed below (rollers 41, 42) and above (roller 43) the rail foot 44 in triangular arrangement. It will be obvious, that the two lower rollers 41, 42, by coacting with the upper roller 43 counteract the deflection of the rail foot and, consequently, of the rail itself. With advantage the rollers are made adjustable in height, for enabling the permissible rail deformation to be varied.

The whole arrangement, that is, the heating member 39, the chilling rose 40 and the rollers 41 to 43 can be moved along the rail at a suitable speed, or alternatively be made stationary, in which case the rails are traversed.

I claim:

1. A method of hardening one surface only of a ferrous article hardenable by heating and quenching to avoid permanent deformation resulting from unequal heating and cooling of the article which comprises heating one surface of the article at a rate sufficient to heat only an outer layer of the material of the article to its hardening temperature while the rest of the article is relatively cool and during said heating mechanically restricting movement of the article caused by the heating to the extent that such restriction causes a permanent compression and a corresponding decrease in the specific volume of the material of the heated surface layer and then quenching the heated layer to form martensite which formation results in an increase of the specific volume of the quenched layer, the mechanical restriction of the article limiting said movement to such an extent that the decrease in specific volume caused by the restriction substantially equals the increase of the specific volume caused by the formation of martensite.

2. A method of hardening the arcuate inner surfaces only of two part divided ferrous connecting rod heads, hardenable by heating and quenching, to avoid permanent deformation resulting from unequal heating and cooling of the connecting rod head, which comprises assembling the parts in juxtaposition with the arcuate inner surfaces facing one another and in such manner that the parts can freely expand, heating the arcuate inner surfaces of the parts at a rate sufficient to heat only an outer surface layer of the material of the parts to the hardening temperature while the rest of the material of the parts is relatively cool and during heating mechanically restricting expansion movement of the parts caused by the heating to the extent that such restriction causes a permanent compression and a corresponding decrease in the specific volume of the material of the heated surface layers and then quenching the heated layers to form martensite which formation results in an increase of the specific volume of the quenched layer, the mechanical restriction of the parts limiting said movement to such an extent that the decrease in specific volume caused by the restriction substantially equals the increase of the specific volume caused by the formation of martensite.

3. A method of hardening the arcuate inner surfaces only of two part divided ferrous connecting rod heads, hardenable by heating and quenching, to avoid permanent deformation resulting from unequal heating and cooling of the connecting rod head, which comprises holding the parts in juxtaposition on bolts with the arcuate inner surfaces of the parts facing one another and with the bolts slacked off so as to permit movement of the parts, interposing a wire between the contiguous edges of the parts to permit the parts to expand, clamping one of the parts in a frame, heating the arcuate inner surfaces of the parts at a rate sufficient to heat only an outer surface layer of the material of the parts to the hardening temperature while the rest of the material of the parts is relatively cool and during heating mechanically restricting expansion movement of the parts caused by the heating to the extent that such restriction causes a permanent compression and a corresponding decrease in the specific volume of the material of the heated surface layers and then quenching the heated layers to form martensite which formation results in an increase of the specific volume of the quenched layer, the mechanical restriction of the parts limiting said movement to such an extent that the decrease in specific volume caused by the restriction substantially equals the increase of the specific volume caused by the formation of martensite.

4. A method of hardening the arcuate inner surfaces only of two part divided ferrous connecting rod heads, hardenable by heating and quenching, to avoid permanent deformation resulting from unequal heating and cooling of the connecting rod head, which comprises holding the parts in juxtaposition on bolts with the arcuate inner surfaces of the parts facing one another and with the bolts slacked off so as to permit movement of the parts, interposing a copper wire between the contiguous edges of the parts to permit the parts to expand, clamping one of the parts in a frame, heating the arcuate inner surfaces of the parts at a rate sufficient to heat only an outer surface layer of the material of the parts to the hardening temperature while the rest of the material of the parts is relatively cool and during heating mechanically restricting expansion movement of the parts caused by the heating to the extent that such restriction causes a permanent compression and a corresponding decrease in the specific volume of the material of the heated surface layers and then quenching the heated layers to form martensite which formation results in an increase of the specific volume of the quenched layer, the mechanical restriction of the parts limiting said movement to such an extent that the decrease in specific volume caused by the restriction substantially equals the increase of the specific volume caused by the formation of martensite.

5. The method of hardening one surface only of substantially straight ferrous articles such as rulers, racks, plates and the like, which articles are hardenable by heating and quenching, to avoid permanent deformation resulting from unequal heating and cooling of the article the steps comprising heating one surface of the article at a rate sufficient to heat only an outer layer of a material of the article to its hardening temperature while the rest of the article is relatively cool and during said heating disposing stops in line with the expanding movement of the free ends of the article to mechanically restrict movement of the article caused by the heating to the extent that such restriction causes a permanent compression and a corresponding decrease in the specific volume of the material of the heated surface layer and then quenching the heated layer to form martensite which formation results in an increase of the specific volume of the quenched layer, the mechanical restriction of the article limiting said movement to such an extent that the decrease in specific volume caused by the restriction substantially equals the increase of the specific volume caused by the formation of martensite.

6. A method of hardening the teeth of ferrous dish-shaped tooth wheels embodying a wheel disc and a rim having the teeth thereon and which wheels are hardenable by heating and quenching and to avoid permanent deformation resulting from unequal heating and cooling of the article the steps comprising heating one face of the toothed part of the rim of the wheel disc at a rate sufficient to heat only an outer layer of the material of the disc to its hardening temperature while the rest of the disc is relatively cool and during said heating mechanically restricting movement of the rim of the disc caused by the heating to the extent that such restriction causes permanent compression and a corresponding decrease in the specific volume of the material of the heated surface layer and then quenching the heated layer to form martensite which formation results in an increase of the specific volume of the quenched layer, the mechanical restriction of the article limiting said movement to such an extent that the decrease in specific volume caused by the restriction substantially equals the increase of the specific volume caused by the formation of martensite.

7. A continuous method of hardening one surface only on an elongated ferrous article hardenable by heating and quenching to avoid permanent deformation resulting from unequal heating and cooling of the article which comprises providing relative movement between the article and a heating source, continuously heating one surface only of the article during the relative movement at a rate sufficient to heat only an outer layer of the material of the article to its hardening temperature while the rest of the article is relatively cool and during said heating continuously mechanically restricting movement of the article caused by the heating to the extent that such restriction causes a permanent compression and a corresponding decrease in the specific volume of the material of the heated surface layer and continuously quenching the heated layer to form martensite which formation results in an increase of the specific volume of the quenched layer, the mechanical restriction of the article limiting said movement to such an extent that the decrease in specific volume caused by the restriction substantially equals the increase of the specific volume caused by the formation of martensite.

8. A method of continuously hardening one surface only of ferrous railroad rails, particularly the head surface thereof and which surface is hardenable by heating and quenching and to avoid permanent deformation resulting from unequal heating and cooling of the rail, the steps comprising providing relative longitudinal movement between the rail and spaced rollers cooperable with the upper and lower surfaces of the foot of the rail, continuously applying heat to the head surface of the rail superjacent the rollers at a rate sufficient to heat only an outer layer of the material of the rail to its hardening temperature while the rest of the rail is relatively cool and during said heating the disposition of the rollers mechanically restricting movement of the article caused by the heating to the extent that such restriction causes a permanent compression and a corresponding decrease in the specific volume in the material of the heated surface layer and continuously quenching the heated layer to form martensite which formation results in an increase of the specific volume of the quenched layer, the mechanical restriction of the article limiting said movement to such an extent that the decrease in specific volume caused by the restriction substantially equals the increase of the specific volume caused by the formation of martensite.

9. A method of hardening one surface only of a ferrous article hardenable by heating and quenching to avoid permanent deformation resulting from unequal heating and cooling of the article which comprises heating one surface of the article at a rate sufficient to heat only an outer layer of the material of the article to its hardening temperature while the rest of the article is relatively cool and adjustably mechanically restricting movement of the article caused by the heating to the extent that such restriction causes a permanent compression and a corresponding decrease in the specific volume of the material of the heated surface layer and then quenching the heated layer to form martensite which formation results in an increase of the specific volume of the quenched layer, the mechanical restriction of the article limiting said movement to such an extent that the decrease in the specific volume caused by the restriction substantially equals the increase of the specific volume caused by the formation of martensite.

JIŘÍ STIVÍN.

REFERENCES CITED

The following references are of record in the file of this patent:

UNITED STATES PATENTS

| Number | Name | Date |
|---|---|---|
| 1,367,049 | Jackman et al. | Feb. 1, 1921 |
| 1,459,208 | Hendrickson | June 19, 1923 |
| 2,209,674 | Burish | July 30, 1940 |
| 2,280,102 | Somes | Apr. 21, 1942 |
| 2,280,552 | Somes | Apr. 21, 1942 |
| 2,288,033 | Somes | June 30, 1942 |

FOREIGN PATENTS

| Number | Country | Date |
|---|---|---|
| 112,784 | Australia | Mar. 21, 1941 |

OTHER REFERENCES

"Flame Hardening by the Oxy-Acetylene Process" by International Acetylene Corp., N. Y., 1940, page 11.